US012665411B2

(12) United States Patent
Lu et al.

(10) Patent No.: US 12,665,411 B2
(45) Date of Patent: Jun. 23, 2026

(54) PHOTOVOLTAIC SYSTEM, FAST SHUTDOWN METHOD, AND PHOTOVOLTAIC INVERTER

(71) Applicant: Huawei Digital Power Technologies Co., Ltd., Shenzhen (CN)

(72) Inventors: Li Lu, Shenzhen (CN); Kai Xin, Shanghai (CN); Xinyu Yu, Shanghai (CN); Boping Yang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 119 days.

(21) Appl. No.: 18/398,769

(22) Filed: Dec. 28, 2023

(65) Prior Publication Data

US 2024/0128739 A1    Apr. 18, 2024

Related U.S. Application Data

(63) Continuation of application No. PCT/CN2021/103479, filed on Jun. 30, 2021.

(51) Int. Cl.
H02H 7/20        (2006.01)
H02M 7/42        (2006.01)
H02S 40/30       (2014.01)

(52) U.S. Cl.
CPC .............. H02H 7/20 (2013.01); H02M 7/42 (2013.01); H02S 40/30 (2014.12)

(58) Field of Classification Search
CPC ................................. H02H 7/20; H02M 7/42
See application file for complete search history.

(56) References Cited

U.S. PATENT DOCUMENTS

| | | | |
|---|---|---|---|
| 2016/0065053 A1* | 3/2016 | Li | H02M 1/36 |
| | | | 363/49 |
| 2016/0111872 A1 | 4/2016 | Kolwalkar et al. | |
| 2020/0195168 A1* | 6/2020 | Gloes | H02J 3/40 |

(Continued)

FOREIGN PATENT DOCUMENTS

| | | |
|---|---|---|
| CN | 207488873 U | 6/2018 |
| CN | 109617523 A | 4/2019 |

(Continued)

OTHER PUBLICATIONS

NFPA 70, "National Electric Code", National Fire Protection Association, Jan. 2017, 881 pages.

*Primary Examiner* — Menatoallah Youssef
*Assistant Examiner* — Esayas G Yeshaw
(74) *Attorney, Agent, or Firm* — Maier & Maier, PLLC

(57)        ABSTRACT

The photovoltaic system includes an inverter, a fan, and a controller. A photovoltaic string and a direct current bus capacitor are connected between a positive input end and negative input end of the inverter. The controller receives a fast shutdown instruction and sends a drive signal to a switching transistor in the inverter, so that the switching transistor performs a switching action under the action of the drive signal, and the switching transistor consumes electric energy during the switching action; or the controller turns on the fan after receiving the fast shutdown instruction to consume electric energy by using the fan; or the controller may send the drive signal to the switching transistor and also control the fan to be turned on, so that both the switching transistor and the fan consume electric energy.

20 Claims, 5 Drawing Sheets

(56)        References Cited

U.S. PATENT DOCUMENTS

| | | | |
|---|---|---|---|
| 2020/0274439 A1 | 8/2020 | Yang et al. | |
| 2022/0302713 A1* | 9/2022 | Wang .................... | H02M 3/156 |
| 2023/0163855 A1* | 5/2023 | Zhao .................... | H04B 10/503 |
| | | | 398/183 |

FOREIGN PATENT DOCUMENTS

| | | | |
|---|---|---|---|
| CN | 110311584 | A | 10/2019 |
| CN | 111725981 | A | 9/2020 |
| JP | H0847176 | A | 2/1996 |
| JP | 2008259282 | A | 10/2008 |
| JP | 2018042337 | A | 3/2018 |
| JP | 2019149867 | A | 9/2019 |
| JP | 2020098935 | A | 6/2020 |
| WO | 2017056922 | A1 | 4/2017 |

* cited by examiner

PHOTOVOLTAIC SYSTEM, FAST SHUTDOWN METHOD, AND PHOTOVOLTAIC INVERTER

CROSS-REFERENCE TO RELATED APPLICATIONS

This application is a continuation of International Application No. PCT/CN2021/103479, filed on Jun. 30, 2021, the disclosure of which is hereby incorporated by reference in its entirety.

TECHNICAL FIELD

The embodiments relate to the field of photovoltaic power generation technologies and to a photovoltaic system, a fast shutdown method, and a photovoltaic inverter.

BACKGROUND

Situations where a photovoltaic system needs to be quickly shut down sometimes occur in the photovoltaic system. To ensure safety, when fast shutdown is triggered, a voltage between any direct current input conductors of an inverter in the photovoltaic system and a voltage of any direct current input conductor of the inverter to the ground both need to be reduced to less than or equal to 30 V within 30 s.

At present, when a photovoltaic system undergoes fast shutdown, an inverter performs shutdown protection after receiving a fast shutdown instruction, and discharge between direct current input conductors of the inverter and discharge of any direct current input conductor of the inverter to the ground are implemented by using respective resistance of the conductors. However, self-discharge of the direct current input conductor performed by using the internal resistance may not meet the fast shutdown standard mentioned above.

To ensure that a voltage between any direct current input conductors of an inverter and a voltage of any direct current input conductor of the inverter to the ground are reduced to less than or equal to 30 V within 30 s during fast shutdown, currently, an energy absorption circuit may be additionally connected in parallel to a direct current bus at an input end of the inverter by using a switching transistor. After receiving a fast shutdown instruction, the inverter controls the switching transistor to be turned on, so that discharge is implemented through the energy absorption circuit. Although this solution can ensure that a discharge speed of the inverter meets the foregoing safety standard, an additional hardware circuit (including the energy absorption circuit and the switching transistor) is added in this solution, increasing costs of the inverter. Furthermore, the added switching transistor brings a misoperation risk.

SUMMARY

The embodiments include a photovoltaic system, a fast shutdown method, and a photovoltaic inverter, so that a voltage on a direct current side can be reduced to less than or equal to a specified voltage within a standard required time when the photovoltaic system needs to be quickly shut down.

An embodiment provides a photovoltaic system, including an inverter, a fan, and a controller. A photovoltaic string and a direct current bus capacitor are connected between a positive input end and negative input end of the inverter. The inverter is configured to convert direct current electricity provided by the photovoltaic string into alternating current electricity, and send the alternating current electricity to an alternating current power grid or a load. The controller is configured to receive a fast shutdown instruction, and reduce a voltage on the direct current bus capacitor in at least one of the following manners, where the at least one manner includes: the controller sends a drive signal to a switching transistor in the inverter, so that the switching transistor performs a switching action under the action of the drive signal, to consume electric energy; or the controller turns on the fan to consume electric energy.

According to the solution provided, after receiving the fast shutdown instruction, the controller sends the drive signal to the switching transistor in the inverter, so that the switching transistor performs the switching action under the action of the drive signal, and the switching transistor consumes electric energy during the switching action; or after receiving the fast shutdown instruction, the controller turns on the fan, to consume electric energy by using the fan; or the controller may send the drive signal to the switching transistor and also control the fan to be turned on, so that both the switching transistor and the fan consume electric energy. In the photovoltaic system provided in this embodiment, with no additional hardware circuit added, a discharge speed of the direct current bus capacitor is increased, so that reduction of a direct current bus voltage is accelerated, thereby ensuring that electricity stored in the direct current bus capacitor is released in a timely manner during fast shutdown of the photovoltaic system, to meet a standard requirement for fast shutdown.

In a possible implementation, the drive signal is generated by using a modulated wave and a carrier; and the controller is configured to: change a frequency of the carrier to change a frequency of the drive signal, and send a changed drive signal to the switching transistor, to increase electric energy consumed by the switching transistor. According to the solution in this embodiment, the frequency of the drive signal may be changed by adjusting the frequency of the carrier, so as to adjust power of electric energy consumed by the switching transistor, so that the switching transistor consumes, within a specified time, electric energy stored in the direct current bus capacitor, thereby ensuring that electricity stored in the direct current bus capacitor is released in a timely manner during fast shutdown of the photovoltaic system, to meet the standard requirement for fast shutdown.

In a possible implementation, the drive signal is generated by using the modulated wave and the carrier; and the controller is configured to: change a frequency of the modulated wave to change the drive signal, and send a changed drive signal to the switching transistor, to increase electric energy consumed by the switching transistor. According to the solution in this embodiment, the frequency of the drive signal may also be changed by adjusting the frequency of the modulated wave, so as to adjust power of electric energy consumed by the switching transistor, so that the switching transistor consumes, within a specified time, electric energy stored in the direct current bus capacitor, thereby ensuring that electricity stored in the direct current bus capacitor is released in a timely manner during fast shutdown of the photovoltaic system, to meet the standard requirement for fast shutdown.

In a possible implementation, the photovoltaic system provided in this embodiment further includes an optimizer. An input end of the inverter is connected to a plurality of photovoltaic strings connected in parallel to each other. Each photovoltaic string includes a plurality of photovoltaic modules and a plurality of optimizers. The plurality of photovoltaic modules are in one-to-one correspondence with the plurality of optimizers. An output end of each photovoltaic module is connected to an input end of a corresponding optimizer. Output ends of all optimizers in one photovoltaic string are connected in series to each other and are connected to the input end of the inverter. The optimizer is configured to receive the fast shutdown instruction, stop working, and disconnect from the photovoltaic module. In addition to a voltage boost function, the optimizer in this embodiment may further have a maximum power point tracking function. Because the optimizer tracks one corresponding photovoltaic module, the optimizer may perform maximum power point tracking (MPPT) on the photovoltaic module corresponding to the optimizer, so that electric energy conversion efficiency of photovoltaic power generation can be improved.

In a possible implementation, the photovoltaic system provided in this embodiment further includes a filter circuit. The inverter includes a power conversion circuit and the filter circuit. An input end of the power conversion circuit is connected to the photovoltaic string. The filter circuit is connected to an output end of the power conversion circuit. When the controller sends the drive signal to the switching transistor in the inverter, the direct current bus capacitor, the switching transistor, and the filter circuit form a path, so that the filter circuit consumes electric energy to reduce the voltage on the direct current bus capacitor. A higher frequency of the drive signal indicates more electric energy consumed by an inductor in the filter circuit. When the photovoltaic system provided in this embodiment includes the filter circuit, the switching transistor and the filter circuit may form a path when the switching transistor acts, so that electric energy is consumed by using impedance in the filter circuit, thereby further accelerating reduction of the direct current bus voltage.

In a possible implementation, the photovoltaic system provided in this embodiment further includes a grid-connected circuit breaker connected between an output end of the inverter and the alternating current power grid. The controller is further configured to control, after receiving the fast shutdown instruction, the grid-connected circuit breaker to disconnect the inverter from the alternating current power grid.

In a possible implementation, the photovoltaic system provided in this embodiment further includes an upper computer. The upper computer is configured to send the fast shutdown instruction to the controller and the optimizer.

In a possible implementation, the frequency of the drive signal is a non-fundamental frequency.

In a possible implementation, the inverter is a three-level T-type inverter.

In a possible implementation, the controller is integrated in a cabinet of the inverter, and the fan is integrated in the cabinet of the inverter.

In a possible implementation, the inverter is a string inverter or a central inverter.

According to the photovoltaic system provided above, an embodiment further provides a fast shutdown method for a photovoltaic system. The photovoltaic system includes an inverter and a fan. The inverter includes a switching transistor. A photovoltaic string and a direct current bus capacitor are connected between a positive input end and negative input end of the inverter. The inverter is configured to convert direct current electricity provided by the photovoltaic string into alternating current electricity, and send the alternating current electricity to an alternating current power grid or a load. The method includes: receiving a fast shutdown instruction; and reducing a voltage on the direct current bus capacitor in at least one of the following manners: sending a drive signal to the switching transistor in the inverter, so that the switching transistor performs a switching action under the action of the drive signal, to consume electric energy; or turning on the fan, so that the fan consumes electric energy.

In a possible implementation, the drive signal is generated by using a modulated wave and a carrier; and the sending a drive signal to the switching transistor in the inverter includes: changing a frequency of the carrier to change a frequency of the drive signal, and sending a changed drive signal to the switching transistor, to increase electric energy consumed by the switching transistor and a filter circuit.

In a possible implementation, the drive signal is generated by using the modulated wave and the carrier; and the sending a drive signal to the switching transistor in the inverter includes: changing a frequency of the modulated wave to change the drive signal, and sending a changed drive signal to the switching transistor, to increase electric energy consumed by the switching transistor and a filter circuit.

In a possible implementation, the photovoltaic system further includes a filter circuit, the filter circuit is connected to an output end of the inverter, and the method further includes: controlling the direct current bus capacitor, the switching transistor, and the filter circuit to form a path, so that the filter circuit consumes electric energy to reduce the voltage on the direct current bus capacitor, where a higher frequency of the drive signal indicates more electric energy consumed by an inductor in the filter circuit.

According to the photovoltaic system and the fast shutdown method for a photovoltaic system that are provided in the foregoing embodiments, an embodiment further provides a photovoltaic inverter, including a power conversion circuit, a fan, and an inverter controller. The power conversion circuit includes a switching transistor. A photovoltaic string and a direct current bus capacitor are connected between a positive input end and negative input end of the power conversion circuit. The inverter controller is configured to receive a fast shutdown instruction, and reduce a voltage on the direct current bus capacitor in at least one of the following manners, where the at least one manner includes: the inverter controller sends a drive signal to the switching transistor, so that the switching transistor performs a switching action under the action of the drive signal, to consume electric energy; or the inverter controller turns on the fan to consume electric energy.

In a possible implementation, the drive signal is generated by using a modulated wave and a carrier; and the inverter controller is configured to: change a frequency of the carrier to change a frequency of the drive signal, and send a changed drive signal to the switching transistor, to increase electric energy consumed by the switching transistor.

In a possible implementation, the drive signal is generated by using the modulated wave and the carrier; and the inverter controller is configured to: change a frequency of the modulated wave to change the drive signal, and send a changed drive signal to the switching transistor, to increase electric energy consumed by the switching transistor.

In a possible implementation, the photovoltaic inverter further includes a filter circuit. An input end of the power conversion circuit is connected to the photovoltaic string. The filter circuit is connected to an output end of the power conversion circuit. When the inverter controller sends the drive signal to the switching transistor, the direct current bus capacitor, the switching transistor, and the filter circuit form a path, so that the filter circuit consumes electric energy to reduce the voltage on the direct current bus capacitor. A higher frequency of the drive signal indicates more electric energy consumed by an inductor in the filter circuit.

From the foregoing solutions, it can be understood that embodiments have at least the following advantages.

The photovoltaic system provided in embodiments includes the inverter, the fan, and the controller. The photovoltaic string and the direct current bus capacitor are connected between the positive input end and negative input end of the inverter. After receiving the fast shutdown instruction, the controller sends the drive signal to the switching transistor in the inverter, so that the switching transistor performs the switching action under the action of the drive signal, and the switching transistor consumes electric energy during the switching action; or after receiving the fast shutdown instruction, the controller turns on the fan, to consume electric energy by using the fan; or the controller may send the drive signal to the switching transistor and also control the fan to be turned on, so that both the switching transistor and the fan consume electric energy, thereby accelerating discharge of the direct current bus capacitor, and reducing a voltage on a direct current side, that is, the input end, of the inverter as fast as possible. In the photovoltaic system provided in this embodiment, with no additional hardware circuit added, the discharge speed of the direct current bus capacitor is increased, so that reduction of the direct current bus voltage is accelerated, thereby ensuring that electricity stored in the direct current bus capacitor is released in a timely manner during fast shutdown of the photovoltaic system, to meet the standard requirement for fast shutdown, that is, reducing the voltage on the direct current side of the inverter to less than or equal to 30 V within 30 s.

DETAILED DESCRIPTION OF EMBODIMENTS

In the following descriptions, the words such as "first" and "second" are merely used for a purpose of description, and shall not be understood as an indication or implication of relative importance or an implicit indication of a quantity of indicated features. Therefore, a feature modified by "first", "second", or the like may explicitly or implicitly include one or more features. In the descriptions of the embodiments, unless otherwise stated, "a plurality of" means two or more than two.

In addition, orientation terms such as "above" and "below" may include, but are not limited to, definitions relative to orientations of components schematically placed in accompanying drawings. It should be understood that these orientation terms may be relative concepts, are used for relative description and clarification, and may correspondingly change based on a change of an orientation in which a component is placed in the accompanying drawings.

In the embodiments, unless otherwise specified and limited, the term "connection" should be understood in a broad sense. For example, the "connection" may be a fixed connection, a detachable connection, or an integration, and may be a direct connection, or an indirect connection implemented through an intermediate medium. In addition, the term "coupling" may be a manner of an electrical connection for implementing signal transmission. The "coupling" may be a direct electrical connection, or may be an indirect electrical connection implemented through an intermediate medium.

To help a person skilled in the art better understand solutions provided in embodiments, the following first describes an architecture of a photovoltaic system.

Figure 1:
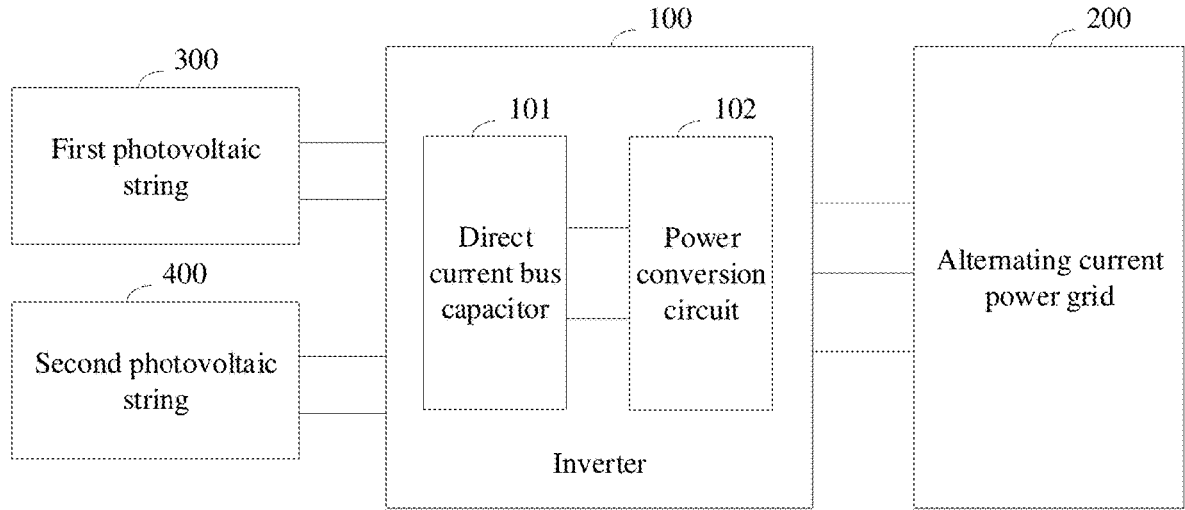
FIG. 1 is a schematic diagram of a structure of a photovoltaic system according to an embodiment.

FIG. 1 is a schematic diagram of a structure of a photovoltaic system according to an embodiment.

The photovoltaic system in this embodiment may include one photovoltaic string, or may include a plurality of photovoltaic strings. For the photovoltaic system in FIG. 1, an example of only two photovoltaic strings is used. This is not limited in this embodiment.

As shown in FIG. 1, the photovoltaic system in this embodiment includes an inverter 100, a first photovoltaic string 300, and a second photovoltaic string 400. The inverter 100 may include a direct current bus capacitor 101 and a power conversion circuit 102. In other words, the direct current bus capacitor 101 may be integrated in a cabinet of the inverter 100. Alternatively, the direct current bus capacitor 101 may be placed outside the cabinet of the inverter 100.

Each of the first photovoltaic string 300 and the second photovoltaic string 400 is connected to an input end of the inverter 100. An output side of the inverter 100 is configured to connect to an alternating current power grid 200. In this embodiment, an example in which the inverter 100 is a three-phase inverter is used for description. It should be understood that the photovoltaic system provided in this embodiment may be a three-phase photovoltaic system, or may be a single-phase photovoltaic system for home use. This is not limited in this embodiment.

A positive input end of the inverter 100 is connected to a positive direct current bus, and a negative input end of the inverter 100 is connected to a negative direct current bus. Because the direct current bus capacitor 101 is connected between the positive direct current bus and the negative direct current bus, during fast shutdown of the photovoltaic system, a comparatively high voltage is still stored at the input end of the inverter 100, that is, on the direct current bus capacitor 101. Therefore, an effective solution is required for quickly discharging the direct current bus capacitor 101 during fast shutdown, so as to reduce a voltage on a direct current side, that is, the input end, of the inverter 100 to less than or equal to 30 V within 30 s.

Currently, to quickly release a voltage on a direct current bus capacitor during fast shutdown, an energy absorption circuit may be additionally connected to a direct current bus at an input end of an inverter by using a switching transistor. After receiving a fast shutdown instruction, the inverter controls the switching transistor to be turned on, so that a voltage on the direct current bus is released through the energy absorption circuit. However, in this manner, the additional hardware circuit needs to be added at the direct current bus, and consequently, costs of a photovoltaic system are increased. Moreover, a mis-action of the switching transistor may occur, causing an unnecessary loss.

Embodiments provide a photovoltaic system, so that a voltage at an input end of an inverter can be quickly reduced during fast shutdown with no need for any additional hardware circuit. After receiving a fast shutdown instruction, a controller may use a switching transistor in the inverter to consume electric energy stored on a direct current bus capacitor, and may also use a fan to consume electric energy stored on the direct current bus capacitor. According to the solutions provided in embodiments, a voltage at an input end of an inverter can be quickly reduced, and no additional hardware circuit needs to be added. Therefore, costs of a photovoltaic system can be reduced.

To help a person skilled in the art better understand the photovoltaic system provided in embodiments, the following describes a structure of an inverter in the photovoltaic system.

The inverter in the photovoltaic system provided in embodiments may be a string inverter or may be a central inverter. The string inverter includes two levels of circuits, where a first-level circuit is a DC/DC (Direct Current/Direct Current) circuit, and a second-level circuit is a DC/AC (Direct Current/Alternating Current) circuit. The central inverter includes only one level of DC/AC circuit. The following uses a string inverter in FIG. 2 as an example to describe the inverter provided in embodiments.

Figure 2:
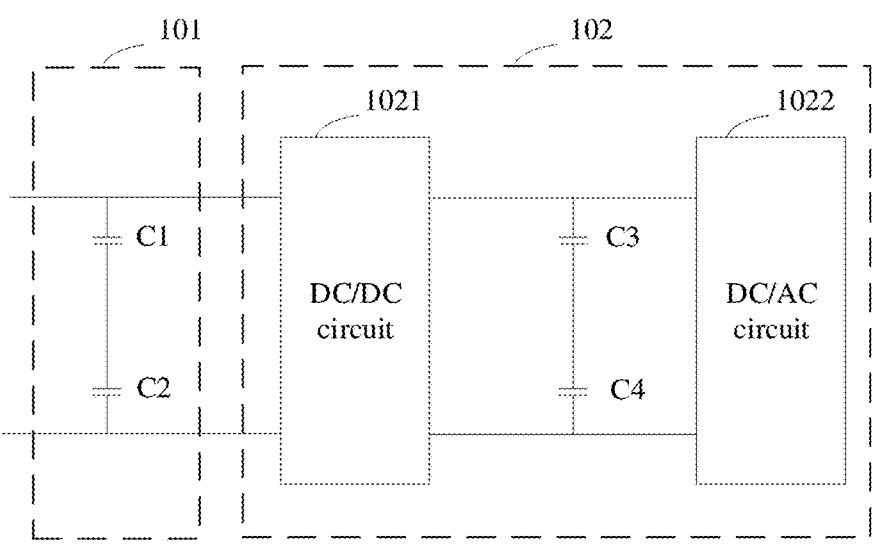
FIG. 2 is a schematic diagram of a structure of an inverter according to an embodiment.

FIG. 2 is a schematic diagram of a structure of an inverter according to an embodiment.

In this embodiment, an example in which a direct current bus capacitor 101 is integrated in the inverter is used for description. As shown in FIG. 2, the inverter in this embodiment includes the direct current bus capacitor 101 and a power conversion circuit 102.

In this embodiment, an example in which the direct current bus capacitor 101 includes a first capacitor C1 and a second capacitor C2 that are connected in series is used for description. It should be noted that, in this embodiment, a structure of the direct current bus capacitor 101 is described by using the first capacitor C1 and the second capacitor C2 merely as an example. In actual application, the direct current bus capacitor may include one capacitor, or may include more capacitors. This is not limited in this embodiment.

An input end of the power conversion circuit 102 in this embodiment is connected to the direct current bus capacitor 101. When the direct current bus capacitor 101 includes a plurality of capacitors, as shown in FIG. 2, the first capacitor C1 and the second capacitor C2 in the direct current bus capacitor 101 that are connected in series are connected between a positive input end of the power conversion circuit 102 and a negative input end of the power conversion circuit 102. When the direct current bus capacitor 101 includes only one capacitor, the direct current bus capacitor 101 is connected between a positive input end of the power conversion circuit 102 and a negative input end of the power conversion circuit 102.

The power conversion circuit 102 includes a DC/DC circuit 1021, a DC/AC circuit 1022, a third capacitor C3, and a fourth capacitor C4. The third capacitor C3 and the fourth capacitor C4 that are connected in series are connected between a positive output end and negative output end of the DC/DC circuit 1021. A positive input end and negative input end of the DC/AC circuit 1022 are respectively connected to the positive output end and negative output end of the DC/DC circuit 1021. It should be understood that the DC/DC circuit 1021 provided in this embodiment is configured to perform boost or buck processing on direct current electricity at an input end of the DC/DC circuit 1021, and then output processed direct current electricity to the DC/AC circuit 1022; and the DC/AC circuit 1022 provided in this embodiment is configured to convert the direct current electricity output by the DC/DC circuit 1021 into alternating current electricity, and provide the alternating current electricity for an alternating current power grid or an alternating current load.

It should be understood that, during fast shutdown of a photovoltaic system, in the solution provided in this embodiment, a direct current voltage at an input end of the inverter is reduced by releasing electric energy stored on the first capacitor C1 and the second capacitor C2.

The following describes, with reference to the accompanying drawings, the photovoltaic system provided in embodiments.

System Embodiment

The photovoltaic system provided in embodiments includes an inverter, a fan, and a controller. A photovoltaic string and a direct current bus capacitor are connected between a positive input end and negative input end of the inverter. After receiving a fast shutdown instruction, the controller sends a drive signal to a switching transistor in the inverter, so that the switching transistor performs a switching action under the action of the drive signal, and the switching transistor consumes electric energy during the switching action; or after receiving a fast shutdown instruction, the controller turns on the fan, to consume electric energy by using the fan; or the controller may send a drive signal to a switching transistor and also control the fan to be turned on, so that both the switching transistor and the fan consume electric energy, thereby accelerating discharge of the direct current bus capacitor, and reducing a direct current bus voltage as fast as possible. In the photovoltaic system provided in embodiments, with no additional hardware circuit added, a discharge speed of the direct current bus capacitor is increased, so that reduction of the direct current bus voltage is accelerated, thereby ensuring that electricity stored in the direct current bus capacitor is released in a timely manner during fast shutdown of the photovoltaic system, to meet a standard requirement for fast shutdown, that is, reducing a voltage on a direct current side of the inverter to less than or equal to 30 V within 30 s.

When the photovoltaic system provided in embodiments includes the fan, the fan provided in embodiments may be integrated in a cabinet of the inverter, and dissipate heat for the inverter when the inverter works normally; or the fan in embodiments may exist independently of the inverter. This is not limited in embodiments. The controller in embodiments may be integrated in the cabinet of the inverter, or may exist independently as a separate device. This is not limited in embodiments. The photovoltaic system provided in embodiments may include a filter circuit, or may include no filter circuit. This is not limited in embodiments. When the photovoltaic system provided in embodiments includes the filter circuit, the filter circuit may serve as an independent device connected to an output end of the inverter, or may be integrated in the inverter. This is not limited. The following uses FIG. 3 as an example to describe a photovoltaic system provided in an embodiment.

Figure 3:
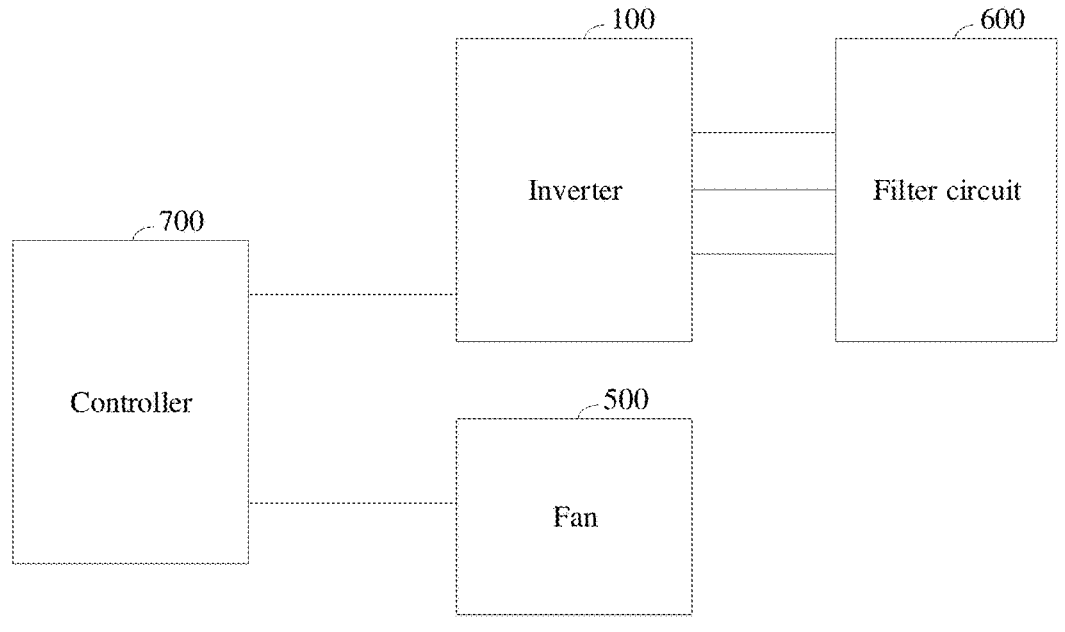
FIG. 3 is a schematic diagram of a structure of another photovoltaic system according to an embodiment.

FIG. 3 is a schematic diagram of a structure of another photovoltaic system according to an embodiment.

The photovoltaic system provided in this embodiment includes an inverter 100, a fan 500, a filter circuit 600, and a controller 700.

A photovoltaic string and a direct current bus capacitor are connected between a positive input end and negative input end of the inverter 100. The inverter 100 is configured to convert direct current electricity provided by the photovoltaic string into alternating current electricity, and send the alternating current electricity to an alternating current power grid or a load. For example, the inverter 100 may be a three-level T-type inverter.

The controller 700 is configured to receive a fast shutdown instruction, and reduce a voltage on the direct current bus capacitor in at least one of the following manners, where the at least one manner includes: the controller 700 sends a drive signal to a switching transistor in the inverter 100, so that the switching transistor performs a switching action under the action of the drive signal, to consume electric energy; or the controller 700 turns on the fan 500 to consume electric energy.

It should be understood that the controller 700 is connected to each of the inverter 100 and the fan 500. In a possible implementation, when the photovoltaic system in this embodiment includes the filter circuit 600, an output end of the inverter 100 is connected to the filter circuit 600. When the switching transistor in this embodiment performs the switching action under the action of the drive signal to consume electric energy, a current on the filter circuit 600 connected to the output end of the inverter 100 also changes correspondingly. In this case, the filter circuit 600 also consumes some electric energy.

It should be noted that, in this embodiment, a frequency of the drive signal may be a non-fundamental frequency. For example, the drive signal sent by the controller to the inverter may be a pulse width modulated (PWM) signal.

It can be understood that, during fast shutdown of the photovoltaic system provided in this embodiment, the controller sends the drive signal to the switching transistor, so as to control the switching transistor to perform the switching action, and the switching transistor consumes electric energy when performing the action, where a higher switching frequency of the switching transistor indicates larger electric energy consumption; or the controller controls the fan to be turned on, so that the fan quickly consumes electric energy. In the solution provided in this embodiment, alternatively, the controller may simultaneously drive the switching transistor and turn on the fan to consume electric energy, thereby accelerating electric energy release of the direct current bus capacitor, so that a voltage on a direct current side, that is, the input end, of the inverter is reduced. Therefore, according to the solution provided in this embodiment, with no additional energy absorption circuit added, a discharge speed of the direct current bus capacitor is increased, so that reduction of a direct current bus voltage is accelerated. This ensures that the inverter releases, in a timely manner during fast shutdown, electricity stored in the direct current bus capacitor, so that a discharge speed of the inverter provided in this embodiment reaches a specified safety standard during fast shutdown, where the standard is that a voltage on a direct current side, that is, an input end, of the inverter is reduced to less than or equal to 30 V within 30 s.

It should be understood that, in the photovoltaic system provided in this embodiment, to quickly reduce the voltage on the direct current bus capacitor during fast shutdown, in a possible implementation, the switching transistor in the inverter may be controlled to perform the switching action to consume electric energy; or in another possible implementation, the photovoltaic system provided in this embodiment may consume electric energy by using the fan. Additionally, in the solution provided in this embodiment, these two solutions may be combined, to consume electric energy by using the fan, the switching transistor in the inverter, and the filter circuit at the same time. In addition, when the photovoltaic system includes the filter circuit, the switching transistor and the filter circuit may form a path when the switching transistor acts, so that electric energy is consumed by using impedance in the filter circuit, thereby further accelerating reduction of the direct current bus voltage.

The photovoltaic system provided in this embodiment does not limit a specific topology of the inverter. For example, the inverter may be a T-type inverter or an I-type inverter, or may be an inverter of another topology. The inverter may be a three-phase inverter, or may be a single-phase inverter. The photovoltaic system in this embodiment may include the filter circuit, or may include no filter circuit. In the following, only a three-phase T-type inverter that includes a filter circuit and that is shown in FIG. 4 is used as an example to describe the solutions provided in embodiments.

Figure 4:
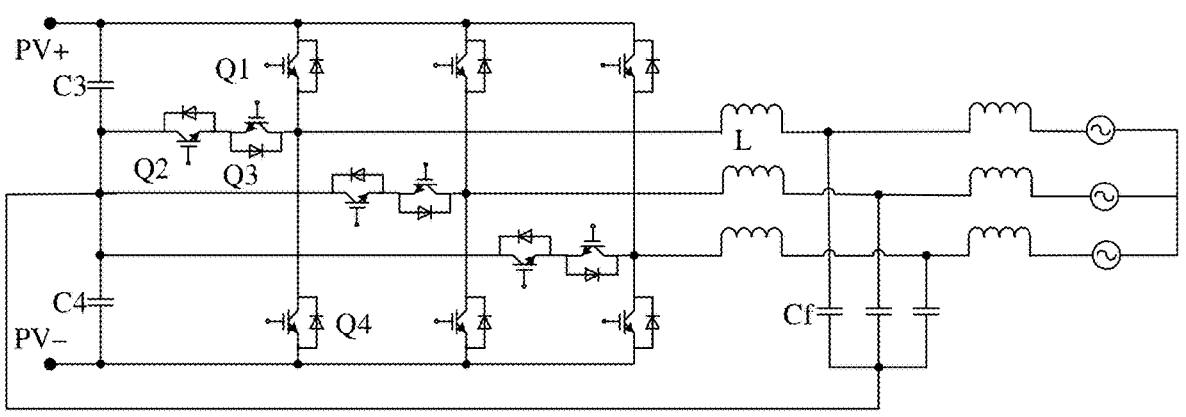
FIG. 4 is a schematic diagram of a structure of a DC/AC circuit in an inverter according to an embodiment.

FIG. 4 is a schematic diagram of a structure of a DC/AC circuit in an inverter according to an embodiment.

FIG. 4 shows the DC/AC circuit in the three-phase inverter. Because a structure of each phase is the same, and each phase is a T-type topology, the following describes a structure of one phase and a working principle during fast shutdown with reference to the accompanying drawing. Circuit structures of the other two phases are similar thereto, and details are not described herein.

One phase in the DC/AC circuit provided in this embodiment includes a first switching transistor Q1, a second switching transistor Q2, a third switching transistor Q3, a fourth switching transistor Q4, an inductor L, and a capacitor Cf.

A first end of a third capacitor C3 is connected to a positive input end of the DC/AC circuit, that is, connected to PV+. A second end of the third capacitor C3 is connected to a first end of a fourth capacitor C4. A second end of the fourth capacitor C4 is connected to a negative input end of the DC/AC circuit, that is, connected to PV—.

A first end of the first switching transistor Q1 is connected to the positive input end PV+ of the DC/AC circuit. A second end of the first switching transistor Q1 is connected to a first end of the inductor L. A second end of the inductor L is connected to a first end of the capacitor Cf. A second end of the capacitor Cf is connected to the second end of the third capacitor C3. A second end of the fourth switching transistor Q4 is connected to the negative input end PV—of the DC/AC circuit. A first end of the fourth switching transistor Q4 is connected to the second end of the first switching transistor Q1. The second switching transistor Q2 and the third switching transistor Q3 are connected in series between the second end of the first switching transistor Q1 and the second end of the third capacitor C3.

The inductor L and the capacitor Cf form a first-phase filter circuit. Likewise, a filter circuit of each of the other two phases also includes an inductor and a capacitor that are connected in series.

It should be understood that, during fast shutdown, to consume electric energy stored on a direct current bus capacitor, for example, when the first switching transistor Q1 is turned on and the fourth switching transistor Q4 is turned on, a path of a discharge current on the direct current bus capacitor is the first switching transistor Q1, the inductor L, and the capacitor Cf. Because the first switching transistor Q1, the inductor L, and the capacitor Cf all have internal resistance, when a current flows through the first switching transistor Q1, the inductor L, and the capacitor Cf, electric energy is consumed by using the internal resistance of the foregoing components. In addition, each switching transistor also has a switching loss and a conduction loss. Because switching transistors in the three-phase circuit are continually turned on or off, a current in the filter circuit in which the inductor L is located continually changes, so that more electric energy can be consumed. In this way, electric energy stored on the direct current bus capacitor is quickly consumed. The inductor is used as an example. The inductor has a copper loss and an iron loss, and the inductor has a skin effect, so that a loss on the inductor is directly proportional to a switching frequency of the switching transistor. A higher switching frequency indicates a larger electric energy loss on the inductor. In this way, electric energy consumption on the direct current bus capacitor can be accelerated, so that a voltage at an input end of the inverter is quickly reduced to less than or equal to 30 V.

In a possible implementation, the drive signal provided in embodiments may be generated by using a modulated wave and a carrier. To accelerate electric energy consumption, and reduce the voltage at the input end of the inverter to less than or equal to 30 V as fast as possible, the controller may change a frequency of the drive signal by changing a frequency of the carrier, and send a changed drive signal to the switching transistor. For example, increasing the frequency of the drive signal, that is, increasing a switching frequency of the switching transistor, can increase a speed at which the switching transistor and the filter circuit consume electric energy. It should be understood that the frequency of the carrier generating the drive signal affects the frequency of the drive signal, and the frequency of the carrier is equal to the frequency of the drive signal generated by the carrier. Therefore, a higher frequency of the carrier results in a higher switching frequency of the switching transistor in the inverter and a higher frequency of current change in the filter circuit, and therefore causes larger power of electric energy consumption of the switching transistor and the filter circuit.

In a possible implementation, the drive signal provided in embodiments is generated by using the modulated wave and the carrier. To accelerate electric energy consumption, and reduce the voltage at the input end of the inverter to less than or equal to 30 V as fast as possible, the controller may change the drive signal by changing a frequency of the modulated wave, and send a frequency-increased drive signal to the switching transistor, so as to increase a speed at which the switching transistor and the filter circuit consume electric energy. It should be understood that the frequency of the modulated wave generating the drive signal affects the frequency of the drive signal to some extent. A higher frequency of the modulated wave indicates a higher frequency of the drive signal generated by the modulated wave, and therefore results in a higher switching frequency of the switching transistor in the inverter and a higher frequency of current change in the filter circuit, thereby causing larger power of electric energy consumption of the switching transistor and the filter circuit.

It should be noted that the frequency of the drive signal provided in embodiments may be a drive signal frequency existent during normal working of the inverter, or may be a specific frequency that is set for fast shutdown of the inverter. This is not limited.

It can be understood from the foregoing content that, during fast shutdown, the photovoltaic system provided in embodiments may consume electric energy by using the switching transistor and the filter circuit; or in another possible implementation, during fast shutdown, the photovoltaic system provided in embodiments may consume electric energy by using the fan, so as to reduce the voltage on the direct current side of the inverter to less than or equal to a standard required voltage as fast as possible.

The following describes, with reference to the accompanying drawings, a solution in which the photovoltaic system provided in embodiments consumes electric energy by using the fan.

Figure 5:
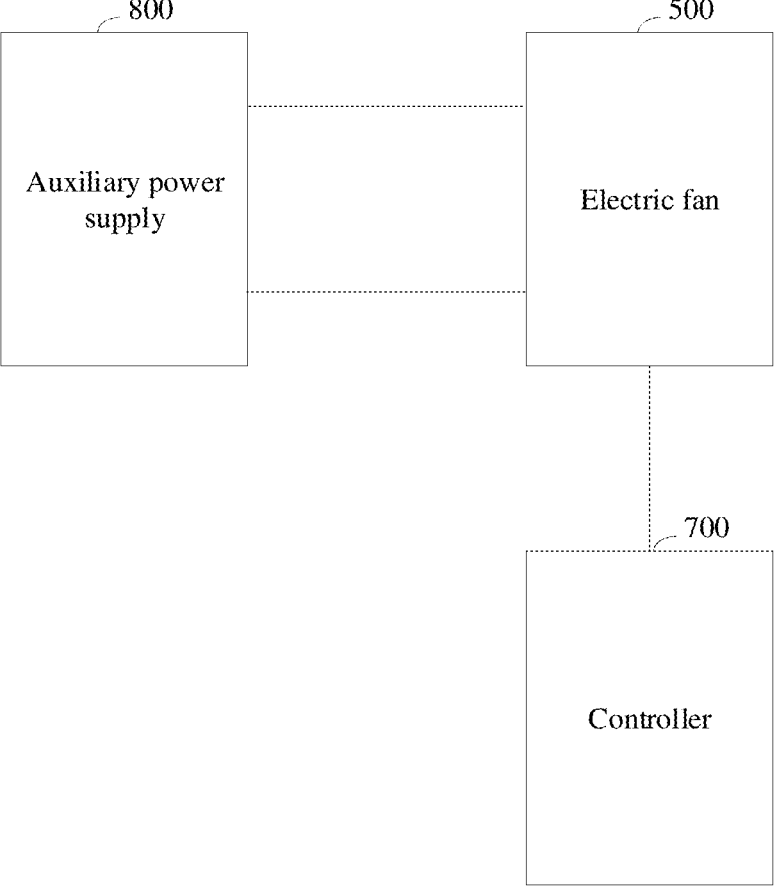
FIG. 5 is a working principle diagram of a fan according to an embodiment.

FIG. 5 is a working principle diagram of a fan according to an embodiment.

The fan 500 provided in this embodiment is powered by using an auxiliary power supply 800, and receives a control signal sent by a controller 700. It should be noted that the auxiliary power supply 800 is not an independent power supply, and a power source of the auxiliary power supply 800 may be a direct current bus. When the controller 700 receives a fast shutdown instruction, running of the fan 500 can consume electric energy of the auxiliary power supply 800, thereby reducing a voltage on a direct current bus capacitor.

In this embodiment, when the controller 700 receives the fast shutdown instruction, the controller 700 turns on the fan, and controls the fan 500 to run, so as to consume electric energy stored in the direct current bus capacitor, thereby implementing fast discharge of the direct current bus capacitor. It should be understood that, to implement fast discharge of the direct current bus capacitor, and reduce a voltage at an input end of an inverter to less than or equal to 30 V within 30 s, in the solution provided in the embodiments, power of the fan may be further controlled to be greater than preset power, or the fan may be controlled to run at a speed greater than a preset speed, so as to ensure that the voltage at the input end of the inverter is reduced to less than or equal to 30 V within 30 s. In this embodiment, the preset power and the preset speed may be set based on an actual requirement.

The following describes a specific implementation in which the photovoltaic system provided in embodiments consumes electric energy by using the switching transistor and the filter circuit.

In embodiments, an example in which two photovoltaic strings are included is still used for description, where each photovoltaic string is described by using an example in which two photovoltaic modules are included. It should be understood that the photovoltaic system may include more photovoltaic strings, and each photovoltaic string may include more photovoltaic modules. In a possible implementation, the photovoltaic system in embodiments may further include an optimizer. A quantity of optimizers may be in one-to-one correspondence with a quantity of photovoltaic modules, or a plurality of photovoltaic modules may correspond to one optimizer. In other words, the quantity of optimizers may be less than or equal to the quantity of photovoltaic modules. For ease of description, in embodiments, an example in which the quantity of optimizers is the same as the quantity of photovoltaic modules and the optimizers are in one-to-one correspondence with the photovoltaic modules is used for description.

Figure 6:
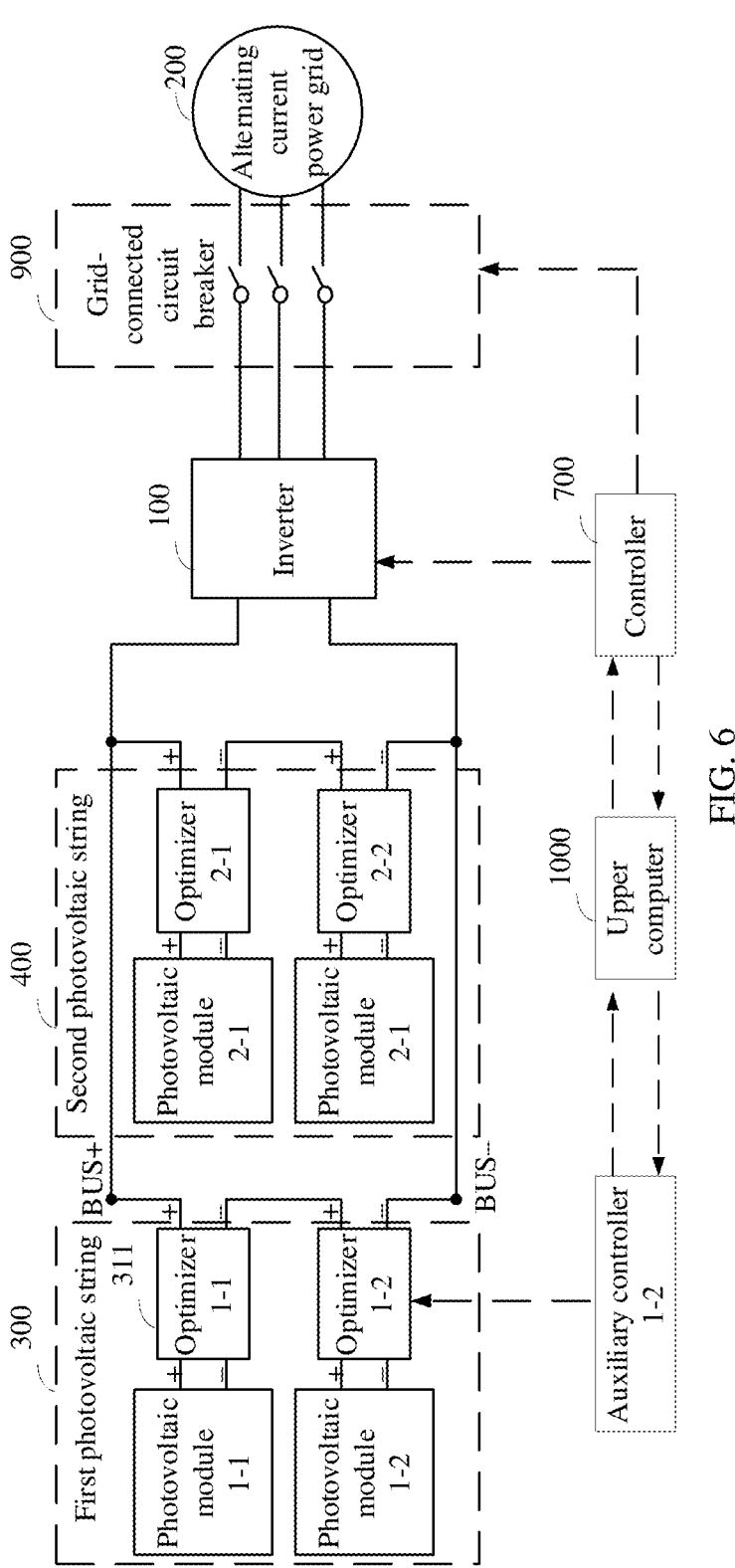
FIG. 6 is a schematic diagram of a structure of still another photovoltaic system according to an embodiment.

FIG. 6 is a schematic diagram of a structure of still another photovoltaic system according to an embodiment.

An input end of an inverter 100 is connected to a plurality of photovoltaic strings, for example, a first photovoltaic string 300 and a second photovoltaic string 400, that are connected in parallel to each other.

Each photovoltaic string includes a plurality of photovoltaic modules. For example, the first photovoltaic string 300 includes a photovoltaic module 1-1 and a photovoltaic module 1-2, and the second photovoltaic string 400 includes a photovoltaic module 2-1 and a photovoltaic module 2-2. In addition, the first photovoltaic string 300 further includes an optimizer 1-1 and an optimizer 1-2, and the second photovoltaic string 400 further includes an optimizer 2-1 and an optimizer 2-2.

For example, the photovoltaic module 1-1 corresponds to the optimizer 1-1, the photovoltaic module 1-2 corresponds to the optimizer 1-2, the photovoltaic module 2-1 corresponds to the optimizer 2-1, and the photovoltaic module 2-2 corresponds to the optimizer 2-2. An output end of each photovoltaic module is connected to an input end of a corresponding optimizer. For example, an output end of the photovoltaic module 1-1 is connected to an input end of the optimizer 1-1, an output end of the photovoltaic module 1-2 is connected to an input end of the optimizer 1-2, an output end of the photovoltaic module 2-1 is connected to an input end of the optimizer 2-1, and an output end of the photovoltaic module 2-2 is connected to an input end of the optimizer 2-2.

Output ends of all optimizers in the photovoltaic string are connected in series to each other and are connected to the input end of the inverter. For example, output ends of the optimizer 1-1 and the optimizer 1-2 in the first photovoltaic string 300 are connected in series to each other and are connected to the input end of the inverter 100, that is, the input ends of the optimizer 1-1 and the optimizer 1-2 in the first photovoltaic string 300 are connected in series between a positive direct current bus BUS+ and a negative direct current bus BUS−; and output ends of the optimizer 2-1 and the optimizer 2-2 in the second photovoltaic string 400 are connected in series to each other and are connected to the input end of the inverter 100, that is, the input ends of the optimizer 2-1 and the optimizer 2-2 in the second photovoltaic string 400 are connected in series between the positive direct current bus BUS+ and the negative direct current bus BUS−.

The optimizer 1-1 is configured to: receive a fast shutdown instruction, stop working, and disconnect from the photovoltaic module 1-1. The optimizer 1-2 is configured to: receive the fast shutdown instruction, stop working, and disconnect from the photovoltaic module 1-2. The optimizer 2-1 is configured to: receive the fast shutdown instruction, stop working, and disconnect from the photovoltaic module 2-1. The optimizer 2-2 is configured to: receive the fast shutdown instruction, stop working, and disconnect from the photovoltaic module 2-2.

It should be understood that, for the photovoltaic system in FIG. 6, only the first photovoltaic string 300 and the second photovoltaic string 400 are used as an example to describe the solution in the embodiments. In actual application, the input end of the inverter 100 may be connected to one or more photovoltaic strings. This is not limited.

The first photovoltaic string 300 in the photovoltaic system in FIG. 6 is described by using an example in which the first photovoltaic string 300 includes the photovoltaic module 1-1 and the photovoltaic module 1-2 that are connected in series. In actual application, the first photovoltaic string 300 or the second photovoltaic string 400 may include one photovoltaic module or more photovoltaic modules connected in series to each other. This is not limited in this embodiment.

It should be noted that the optimizer in this embodiment may be used for DC/DC boost, or may be used for buck and boost or buck. For example, the optimizer in this embodiment may also include a boost circuit. In addition to a voltage boost function, the optimizer in this embodiment may further have a maximum power point tracking (MPPT) function. Because the optimizer tracks one corresponding photovoltaic module, the optimizer may perform MPPT on the photovoltaic module corresponding to the optimizer, so that electric energy conversion efficiency of photovoltaic power generation can be improved.

In a possible implementation, the photovoltaic system provided in this embodiment may further include a grid-connected circuit breaker 900 connected between an output end of the inverter 100 and an alternating current power grid 200; and a controller 700 is further configured to control, after receiving the fast shutdown instruction, the grid-connected circuit breaker 900 to disconnect the inverter 100 from the alternating current power grid 200.

It should be understood that, after receiving the fast shutdown instruction, the controller provided in this embodiment may first control the grid-connected circuit breaker to disconnect the inverter from the alternating current power grid. After the grid-connected circuit breaker disconnects the inverter from the alternating current power grid, a voltage at the input end of the inverter is reduced in at least one of the following manners, where the at least one manner includes: the controller sends a drive signal to a switching transistor in the inverter, so that the switching transistor and a filter circuit consume electric energy; or the controller turns on a fan to consume electric energy.

The output end of the inverter provided in this embodiment may include a relay. Correspondingly, the output end of the inverter is connected to the grid-connected circuit breaker by using the relay. The relay is configured to protect the inverter. The relay may be integrated in a cabinet of the inverter, or may be independent of a cabinet of the inverter. This is not limited in this embodiment.

It should be noted that the inverter provided in this embodiment may be directly connected to the alternating current power grid, or may be connected to the alternating current power grid by using a transformer, that is, the transformer is connected between the output end of the inverter and the alternating current power grid. The transformer is configured to electrically isolate the inverter from the alternating current power grid. For example, the output end of the inverter may be connected to a primary-side winding of the transformer through the relay, and a secondary-side winding of the transformer may be connected to the alternating current power grid through the grid-connected circuit breaker.

In a possible implementation, the photovoltaic system provided in this embodiment may further include an upper computer 1000.

The upper computer 1000 is configured to send the fast shutdown instruction to the controller 700 and the optimizers (the optimizer 1-1, the optimizer 1-2, the optimizer 2-1, and the optimizer 2-2).

It should be understood that the optimizer also has a control function. Each optimizer may correspond to one auxiliary controller, and the auxiliary controller may implement control on the optimizer. For example, the optimizer 1-2 includes an auxiliary controller 1-2.

As shown in FIG. 6, in this embodiment, an example in which the upper computer 1000 sends the fast shutdown instruction to the optimizer 1-2 is used. The upper computer 1000 sends the fast shutdown instruction to the auxiliary controller 1-2 corresponding to the optimizer 1-2, and the auxiliary controller 1-2 controls the optimizer 1-2 to stop working and disconnect from the photovoltaic module 1-2. The controller 700 and the auxiliary controller 1-2 are control devices independent of each other.

Therefore, when the photovoltaic inverter provided in this embodiment receives the fast shutdown instruction, the inverter controller sends the drive signal to the switching transistor, and the switching transistor performs a switching action under the action of the drive signal, where a higher frequency of the drive signal indicates larger power consumption caused by the switching action of the switching transistor; or the inverter controller turns on the fan, so that the fan quickly consumes electric energy. In the solution provided in this embodiment, alternatively, the controller may simultaneously drive the switching transistor and turn on the fan to consume electric energy, thereby accelerating electric energy release of a direct current bus capacitor, so that a voltage on a direct current side, that is, the input end, of the inverter is reduced. Therefore, according to the solution provided in this embodiment, with no additional energy absorption circuit added, a discharge speed of the direct current bus capacitor is increased, so that reduction of a direct current bus voltage is accelerated. This ensures that the inverter releases, in a timely manner during fast shutdown, electricity stored in the direct current bus capacitor. Therefore, the photovoltaic inverter provided in this embodiment can meet a standard requirement during fast shutdown, where the requirement is that the voltage on the direct current side, that is, the input end, is reduced to less than or equal to 30 V within 30 s.

Method Embodiment

Based on the photovoltaic system provided in the foregoing embodiments, embodiments further provide a fast shutdown method for a photovoltaic system. The following provides detailed descriptions with reference to the accompanying drawings.

A photovoltaic system to which the fast shutdown method for a photovoltaic system provided in embodiments is applied may include a filter circuit, or may include no filter circuit. This is not limited in embodiments. When the photovoltaic system provided in embodiments includes no filter circuit, electric energy may be consumed by using a switching transistor under the action of a drive signal. The following uses FIG. 7 as an example to describe a fast shutdown method for a photovoltaic system provided in an embodiment.

Figure 7:
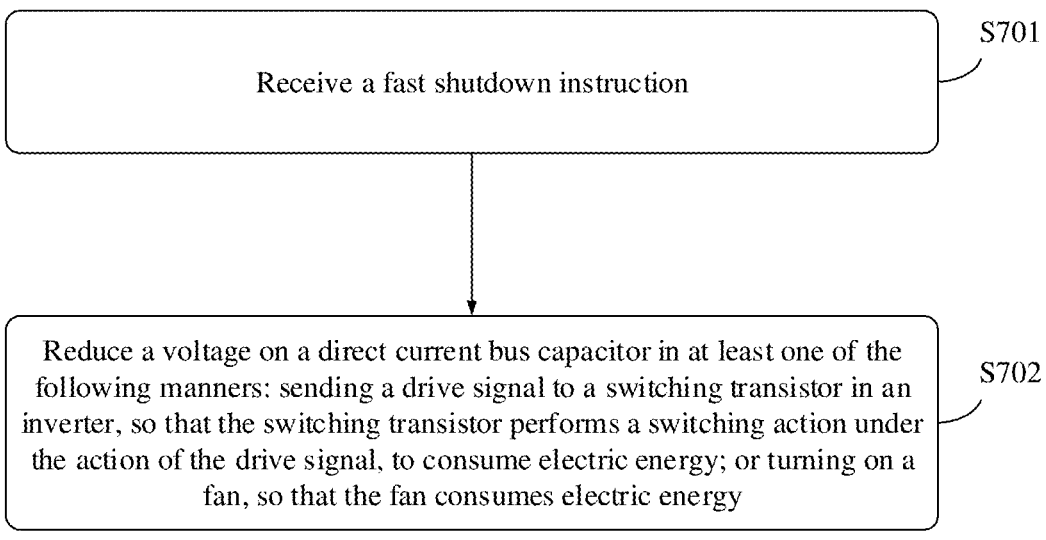
FIG. 7 is a flowchart of a fast shutdown method for a photovoltaic system according to an embodiment.

FIG. 7 is a flowchart of a fast shutdown method for a photovoltaic system according to an embodiment.

A photovoltaic system to which the fast shutdown method for a photovoltaic system provided in this embodiment is applied includes an inverter and a fan. The inverter includes a switching transistor and a filter circuit. A photovoltaic string and a direct current bus capacitor are connected between a positive input end and negative input end of the inverter. The inverter is configured to convert direct current electricity provided by the photovoltaic string into alternating current electricity, and send the alternating current electricity to an alternating current power grid or a load. The method includes the following steps.

S701: Receive a fast shutdown instruction.

S702: Reduce a voltage on the direct current bus capacitor in at least one of the following manners: sending a drive signal to the switching transistor in the inverter, so that the switching transistor performs a switching action under the action of the drive signal, to consume electric energy; or turning on the fan, so that the fan consumes electric energy.

In a possible implementation, the drive signal in this embodiment may be generated by using a modulated wave and a carrier. In this embodiment, the sending a drive signal to the switching transistor in the inverter includes: changing a frequency of the carrier to change a frequency of the drive signal, and sending a changed drive signal to the switching transistor, to increase electric energy consumed by the switching transistor and the filter circuit.

In a possible implementation, the drive signal in this embodiment is generated by using the modulated wave and the carrier. In this embodiment, the sending a drive signal to the switching transistor in the inverter includes: changing a frequency of the modulated wave to change the drive signal, and sending a changed drive signal to the switching transistor, to increase electric energy consumed by the switching transistor and the filter circuit.

In a possible implementation, the turning on the fan in this embodiment includes: turning on the fan, and controlling the fan to run at a speed greater than a preset speed.

In a possible implementation, when the photovoltaic system includes the filter circuit, the method provided in this embodiment may further include: controlling the direct current bus capacitor, the switching transistor, and the filter circuit to form a path, so that the filter circuit consumes electric energy to reduce the voltage on the direct current bus capacitor. For example, the filter circuit includes an inductor and a capacitor that are connected in series. Both the inductor and the capacitor have impedance, and electric energy is consumed when a current passes through the impedance.

Therefore, according to the fast shutdown method for a photovoltaic system provided in this embodiment, after the fast shutdown instruction is received, the switching transistor is driven to perform the switching action or the fan is turned on to quickly consume electric energy. With no additional hardware circuit added, a speed of releasing electricity stored in the direct current bus capacitor is increased during fast shutdown, so as to ensure that the inverter releases, in a timely manner during fast shutdown, the electricity stored in the direct current bus capacitor, thereby reducing a voltage on a direct current side of the inverter to less than or equal to 30 V within 30 s.

Inverter Embodiment

Based on the photovoltaic system and the fast shutdown method for a photovoltaic system that are provided in the foregoing embodiments, embodiments further provide a photovoltaic inverter. The following provides detailed descriptions with reference to the accompanying drawings.

The photovoltaic inverter provided in embodiments may be a central inverter, or may be a string inverter. In embodiments, the string inverter is used as an example for description.

An input end of the photovoltaic inverter provided in embodiments may be connected to a plurality of photovoltaic strings, or may be connected to a single photovoltaic string. This is not limited herein. The following provides descriptions by using an example in which the input end of the photovoltaic inverter is connected to two photovoltaic strings.

Figure 8:
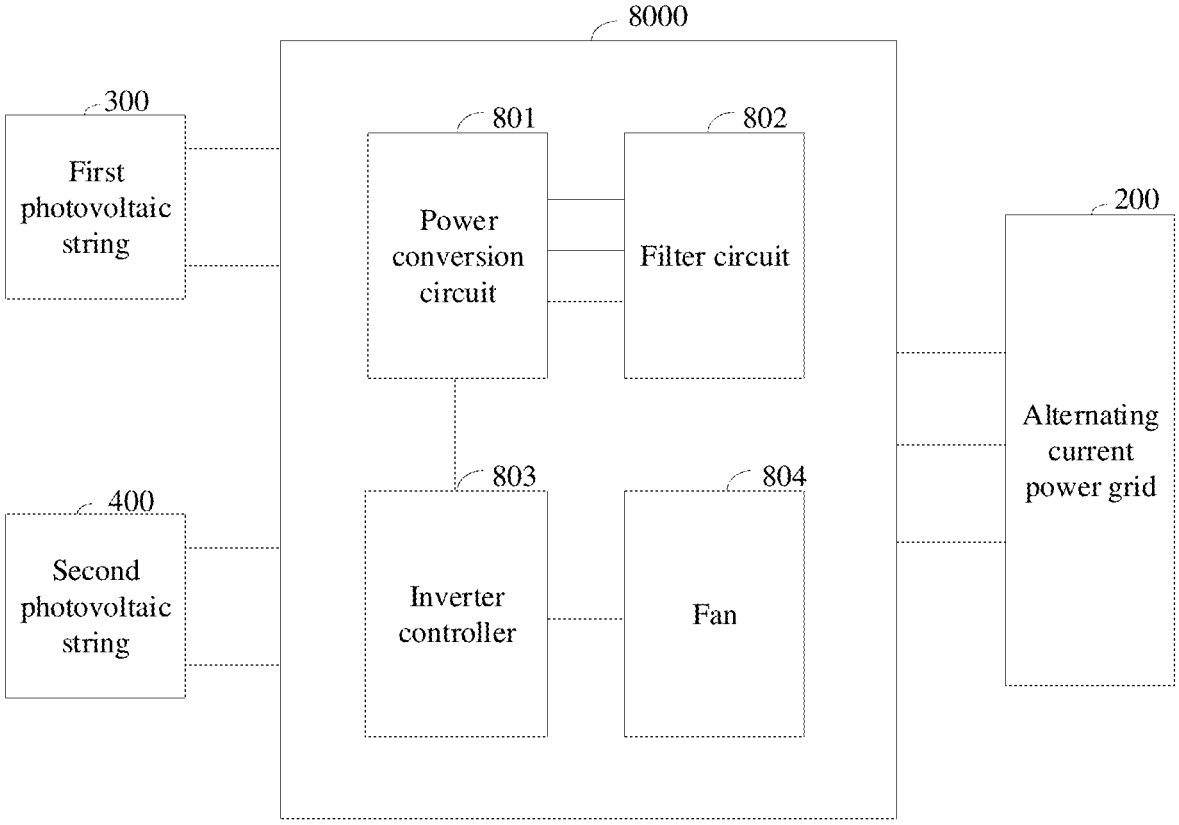
FIG. 8 is a schematic diagram of a structure of a photovoltaic inverter according to an embodiment.

FIG. 8 is a schematic diagram of a structure of a photovoltaic inverter according to an embodiment.

An input end of the photovoltaic inverter 8000 in this embodiment is configured to connect to each of a first photovoltaic string 300 and a second photovoltaic string 400, and an output end of the photovoltaic inverter 8000 is configured to connect to an alternating current power grid 200.

In this embodiment, an example in which the photovoltaic inverter 8000 includes a filter circuit 802 is used for description. Alternatively, the photovoltaic inverter 8000 may include no filter circuit.

As shown in FIG. 8, the photovoltaic inverter 8000 provided in this embodiment includes a power conversion circuit 801, the filter circuit 802, a fan 804, and an inverter controller 803. The power conversion circuit 801 includes a switching transistor. A specific type of the switching transistor is not limited in this embodiment, provided that the switching transistor is a controllable switching transistor.

A photovoltaic string and a direct current bus capacitor are connected between a positive input end and negative input end of the power conversion circuit 801. The filter circuit 802 is connected to an output end of the power conversion circuit.

The inverter controller 803 is configured to receive a fast shutdown instruction, and reduce a voltage on the direct current bus capacitor in at least one of the following manners, where the at least one manner includes: the inverter controller 803 sends a drive signal to the switching transistor, so that the switching transistor and the filter circuit 802 consume electric energy; or the inverter controller 803 turns on the fan 804 to consume electric energy.

It should be understood that this embodiment is a solution in which the fan 804 and the inverter controller 803 are integrated in the photovoltaic inverter. In terms of actual functions and effects, the inverter controller is equivalent to the controller in the foregoing embodiments, and the fan is equivalent to the fan in the foregoing embodiments. Correspondingly, in this embodiment, a frequency of the drive signal may be a non-fundamental frequency. For example, the drive signal sent by the inverter controller to the switching transistor may be a pulse width modulated signal.

In a possible implementation, the drive signal in this embodiment is generated by using a modulated wave and a carrier; and the inverter controller is configured to: change a frequency of the carrier to change the frequency of the drive signal, and send a changed drive signal to the switching transistor, to increase electric energy consumed by the switching transistor and the filter circuit.

In a possible implementation, the drive signal in this embodiment is generated by using the modulated wave and the carrier; and the inverter controller is configured to: change a frequency of the modulated wave to change the drive signal, and send a changed drive signal to the switching transistor, to increase electric energy consumed by the switching transistor and the filter circuit.

In a possible implementation, the photovoltaic inverter in this embodiment further includes the filter circuit, an input end of the power conversion circuit is connected to the photovoltaic string, and the filter circuit is connected to the output end of the power conversion circuit. When the inverter controller sends the drive signal to the switching transistor, the direct current bus capacitor, the switching transistor, and the filter circuit form a path, so that the filter circuit consumes electric energy to reduce the voltage on the direct current bus capacitor.

Thus, after receiving the fast shutdown instruction, the photovoltaic inverter provided in this embodiment drives the switching transistor to perform the switching action or turns on the fan to quickly consume electric energy. With no additional hardware circuit added, an electricity release speed of the direct current bus capacitor is increased, so as to ensure that electricity stored in the direct current bus capacitor is released in a timely manner during fast shutdown, thereby reducing a voltage on a direct current side, that is, the input end, of the inverter to less than or equal to 30 V within 30 s.

It should be understood that, in the embodiments, "at least one (item)" means one or more, and "a plurality of" means two or more. The term "and/or" is used to describe an association relationship between associated objects, and represents that three relationships may exist. For example, "A and/or B" may represent the following three cases: only A exists, only B exists, and both A and B exist, where A and B each may be singular or plural. The character "I" generally indicates an "or" relationship between associated objects. "At least one of the following items (pieces)" or a similar expression thereof refers to any combination of these items, including a single item (piece) or any combination of a plurality of items (pieces). For example, at least one of a, b, or c may represent a, b, c, "a and b", "a and c", "b and c", or "a, b, and c", where a, b, and c each may be singular or plural.

The foregoing embodiments are merely intended for describing solutions rather than limiting the embodiments. Although described in detail with reference to the foregoing embodiments, persons of ordinary skill in the art should understand that they may still make modifications to the solutions described in the foregoing embodiments or make equivalent replacements to some features thereof, without making the essence of the corresponding solutions depart from the spirit and scope of the solutions in the embodiments.

What is claimed is:

1. A photovoltaic system, comprising:
   an inverter,
   a fan,
   a controller,
   a photovoltaic string and a direct current bus capacitor that are connected between a positive input end and negative input end of the inverter; and
   an optimizer; wherein
   the inverter is configured to convert direct current electricity provided by the photovoltaic string into alternating current electricity, and send the alternating current electricity to an alternating current power grid or a load;
   the controller is configured to receive a fast shutdown instruction and reduce a voltage on the direct current bus capacitor within a predetermined period of time by at least one of:
   sending, by the controller, a drive signal to a switching transistor in the inverter, so that the switching transistor performs a switching action under the action of the drive signal, to consume electric energy; and
   turning on, by the controller, the fan to consume electric energy;
   an input end of the inverter is connected to a plurality of photovoltaic strings connected in parallel to each other, each photovoltaic string comprises a plurality of photovoltaic modules and a plurality of optimizers, the plurality of photovoltaic modules are in one-to-one correspondence with the plurality of optimizers, an output end of each photovoltaic module is connected to an input end of a corresponding optimizer, and output ends of all optimizers in one photovoltaic string are connected in series to each other and are connected to the input end of the inverter; and the optimizer is configured to receive the fast shutdown instruction, stop working, and disconnect from the photovoltaic module.

2. The photovoltaic system according to claim 1, wherein the drive signal is generated by using a modulated wave and a carrier; and the controller is configured to:

change a frequency of the carrier to change a frequency of the drive signal, and send a changed drive signal to the switching transistor to increase electric energy consumed by the switching transistor.

3. The photovoltaic system according to claim 1, wherein the drive signal is generated by using the modulated wave and the carrier; and the controller is configured to:

change a frequency of the modulated wave to change the drive signal, and send a changed drive signal to the switching transistor to increase electric energy consumed by the switching transistor.

4. The photovoltaic system according to claim 1, wherein the inverter comprises a power conversion circuit and a filter circuit, an input end of the power conversion circuit is connected to the photovoltaic string, and the filter circuit is connected to an output end of the power conversion circuit; and when the controller sends the drive signal to the switching transistor in the inverter, the direct current bus capacitor, the switching transistor, and the filter circuit form a path, so that the filter circuit consumes electric energy to reduce the voltage on the direct current bus capacitor, wherein a higher frequency of the drive signal indicates more electric energy consumed by an inductor in the filter circuit.

5. The photovoltaic system according to claim 1, further comprising a grid-connected circuit breaker connected between an output end of the inverter and the alternating current power grid, wherein the controller is further configured to control, after receiving the fast shutdown instruction, the grid-connected circuit breaker to disconnect the inverter from the alternating current power grid.

6. The photovoltaic system according to claim 1, further comprising an upper computer, wherein the upper computer is configured to send the fast shutdown instruction to the controller and the optimizer.

7. The photovoltaic system according to claim 1, wherein a frequency of the drive signal is a non-fundamental frequency.

8. The photovoltaic system according to claim 1, wherein the inverter is a three-level T-type inverter.

9. The photovoltaic system according to claim 1, wherein the controller is integrated in a cabinet of the inverter, and the fan is integrated in the cabinet of the inverter.

10. The photovoltaic system according to claim 1, wherein the inverter is a string inverter or a central inverter.

11. A fast shutdown method for a photovoltaic system, wherein the photovoltaic system comprises an inverter and a fan, the inverter comprises a switching transistor, a photovoltaic string, an optimizer, and a direct current bus capacitor are connected between a positive input end and negative input end of the inverter, and the inverter is configured to convert direct current electricity provided by the photovoltaic string into alternating current electricity, and send the alternating current electricity to an alternating current power grid or a load; wherein an input end of the inverter is connected to a plurality of photovoltaic strings connected in parallel to each other, each photovoltaic string comprises a plurality of photovoltaic modules and a plurality of optimizers, the plurality of photovoltaic modules are in one-to-one correspondence with the plurality of optimizers, an output end of each photovoltaic module is connected to an input end of a corresponding optimizer, and output ends of all optimizers in one photovoltaic string are connected in series to each other and are connected to the input end of the inverter; and and the method comprises:

receiving a fast shutdown instruction; and reducing a voltage on the direct current bus capacitor within a predetermined period of time by at least one of:

sending a drive signal to the switching transistor in the inverter, so that the switching transistor performs a switching action under the action of the drive signal, to consume electric energy; and turning on the fan, so that the fan consumes electric energy; and wherein the optimizer is configured to receive the fast shutdown instruction, stop working, and disconnect from the photovoltaic module.

12. The method according to claim 11, wherein the drive signal is generated by using a modulated wave and a carrier; and sending the drive signal to the switching transistor in the inverter comprises:

changing a frequency of the carrier to change a frequency of the drive signal, and sending a changed drive signal to the switching transistor, to increase electric energy consumed by the switching transistor and a filter circuit.

13. The method according to claim 11, wherein the drive signal is generated by using the modulated wave and the carrier; and sending the drive signal to the switching transistor in the inverter comprises:

changing a frequency of the modulated wave to change the drive signal, and sending a changed drive signal to the switching transistor, to increase electric energy consumed by the switching transistor and the filter circuit.

14. The method according to claim 11, wherein the photovoltaic system further comprises a filter circuit, the filter circuit is connected to an output end of the inverter, and the method further comprises:

controlling the direct current bus capacitor, the switching transistor, and the filter circuit to form a path, so that the filter circuit consumes electric energy to reduce the voltage on the direct current bus capacitor, wherein a higher frequency of the drive signal indicates more electric energy consumed by an inductor in the filter circuit.

15. A photovoltaic inverter, comprising:

a power conversion circuit comprising a switching transistor, a fan, an optimizer, and an inverter controller, a photovoltaic string and a direct current bus capacitor are connected between a positive input end and negative input end of the power conversion circuit; and the inverter controller is configured to receive a fast shutdown instruction, and reduce a voltage on the direct current bus capacitor within a predetermined period of time by at least one of: sending, by the inverter controller, a drive signal to the switching transistor, so that the switching transistor performs a switching action under the action of the drive signal, to consume electric energy; and turning on, by the inverter controller, the fan to consume electric energy, wherein an input end of the inverter is connected to a plurality of photovoltaic strings connected in parallel to each other, each photovoltaic string comprises a plurality of photovoltaic modules and a plurality of optimizers, the plurality of photovoltaic modules are in one-to-one correspondence with the plurality of optimizers, an output end of each photovoltaic module is connected to an input end of a corresponding optimizer, and output ends of all optimizers in one photovoltaic string are connected in series to each other and are connected to the input end of the inverter; and the optimizer is configured to receive the fast shutdown instruction, stop working, and disconnect from the photovoltaic module.

16. The photovoltaic inverter according to claim 15, wherein the drive signal is generated by using a modulated wave and a carrier; and the inverter controller is configured to: change a frequency of the carrier to change a frequency of the drive signal and send a changed drive signal to the switching transistor, to increase electric energy consumed by the switching transistor.

17. The photovoltaic inverter according to claim 15, wherein the drive signal is generated by using the modulated wave and the carrier; and the inverter controller is configured to: change a frequency of the modulated wave to change the drive signal and send a changed drive signal to the switching transistor, to increase electric energy consumed by the switching transistor.

18. The photovoltaic inverter according to claim 15, further comprising a filter circuit, wherein an input end of the power conversion circuit is connected to the photovoltaic string, and the filter circuit is connected to an output end of the power conversion circuit; and when the inverter controller sends the drive signal to the switching transistor, the direct current bus capacitor, the switching transistor, and the filter circuit form a path, so that the filter circuit consumes electric energy to reduce the voltage on the direct current bus capacitor, wherein a higher frequency of the drive signal indicates more electric energy consumed by an inductor in the filter circuit.

19. The photovoltaic system according to claim 13, wherein each of the plurality of optimizers is configured to perform maximum power point tracking on the photovoltaic module corresponding to the optimizer.

20. The photovoltaic system according to claim 1, where the controller is configured to reduce the voltage to less than or equal to 30V within 30 seconds.

* * * * *